April 18, 1933.  W. E. BOYETTE  1,904,611
AUTOMOTIVE VEHICLE
Filed Sept. 23, 1932  9 Sheets-Sheet 2

April 18, 1933. W. E. BOYETTE 1,904,611
AUTOMOTIVE VEHICLE
Filed Sept. 23, 1932 9 Sheets-Sheet 6

Inventor
William E. Boyette
Geo. P. Kimmel
Attorney

April 18, 1933. W. E. BOYETTE 1,904,611
AUTOMOTIVE VEHICLE
Filed Sept. 23, 1932 9 Sheets-Sheet 7

April 18, 1933.  W. E. BOYETTE  1,904,611
AUTOMOTIVE VEHICLE
Filed Sept. 23, 1932  9 Sheets-Sheet 8

Patented Apr. 18, 1933

1,904,611

UNITED STATES PATENT OFFICE

WILLIAM E. BOYETTE, OF JACKSONVILLE, FLORIDA, ASSIGNOR TO BOYETTE AIR ELECTRIC CAR, INC., A CORPORATION OF FLORIDA

AUTOMOTIVE VEHICLE

Application filed September 23, 1932. Serial No. 634,607.

This invention relates to an automotive coach of that type for use for transportation lines, and has for its object to provide, in a manner as hereinafter set forth, a coach of the class referred to including a controllable compressed air operated propelling mechanism therefor.

A further object of the invention is to provide, in a manner as hereinafter set forth, an automotive coach including an air compressing structure operated on the travel of the coach for supplying compressed air to air storage receivers, and controllable means associated with the latter to provide for the propelling of the coach by compressed air.

A further object of the invention is to provide, in a manner as hereinafter set forth, a compressed air driven coach and electric means for operating air compressing means when occasion requires.

A further object of the invention is to provide, in a manner as hereinafter set forth, a coach of the class referred to including an air compressing structure operated on the travel of the coach for supplying compressed air to air storage receivers and with after coolers for the compressed air for the passage of the latter prior to the passage of the air to the receivers, and controllable means associated with the latter to provide for the propelling of the coach from compressed air and the stoppage of the coach when desired.

A further object of the invention is to provide, in a manner as hereinafter set forth, a coach of the class referred to including a crank shaft initially operated from an electric motor, an air compressor structure driven from said crank shaft for supplying compressed air to air storage receivers, an air compressor structure driven from the vehicle on the travel of the latter, controllable means associated with said receivers to provide for the propelling of the coach from compressed air and the stoppage of the coach when desired.

A further object of the invention is to provide, in a manner as hereinafter set forth, a coach of the class referred to including an air compressing means for supplying air to a compressed air storage means, an element driven from the coach during the travel of the latter for operating said compressing means, an air compressor structure for supplying compressed air to said storage means, an electric motor for driving said structure when occasion requires, a storage battery in circuit with the motor, a generator operated from the coach on the travel thereof for charging the battery, and controllable means associated with the compressed air storage means to provide for the propelling of the coach by compressed air in the direction desired and the stoppage of the coach when occasion requires.

A further object of the invention is to provide, in a manner as hereinafter set forth, a compressed air driven coach capable of travelling at a high rate of speed when desired.

A further object of the invention is to provide, in a manner as hereinafter set forth, an automotive coach including an electric motor, a pair of air compressing units, one driven from the vehicle on the travel of the latter and the other by the electric motor, after coolers for receiving compressed air from and for returning it to the units for further compression, a compressed air storage reservoir for receiving compressed air from the units subsequent to the return of the compressed air from the after coolers to the units, and a cooling water circulating line common to said units, after coolers and motor.

A further object of the invention is to provide, in a manner as hereinafter set forth, an automotive coach propelled by compressed air and including a pair of air compressors one driven from an element operated from and on the travel of the coach, and electrical means carried by the coach for operating the other of said compressors.

A further object of the invention is to provide, in a manner as hereinafter set forth, an automotive coach including a compressed air operated propelling means therefor, and an air compressing means associated with said propelling means and driven from the front axle of the coach.

A further object of the invention is to provide, in a manner as hereinafter set forth, an automotive coach including a pair of rear axles, one arranged forwardly of the other, a compressed air operated means acting upon the forward rear axle for propelling the coach, a front axle, an air compressing structure associated with said means and driven from the front axle of the coach on the travel of the latter.

Further objects of the invention are to provide, in a manner as hereinafter set forth, an automotive coach driven from compressed air, and which is comparatively simple in its construction and arrangement, strong, durable, compact, speedy, having its direction of travel and stoppage conveniently controlled, comparatively inexpensive to upkeep and operate, readily repaired when occasion requires and thoroughly efficient when used for the purpose intended.

To the above ends essentially and to others which may hereinafter appear, the invention consists of such parts, and such combination of parts which fall within the scope of the invention as claimed.

The drawings do not illustrate the body of the coach, as the body may be of any suitable construction, but they do show the coach body support and the coacting means employed to provide for a thoroughly efficient operation of the coach when the latter is used for transporting passengers or freight.

Figure 1A:
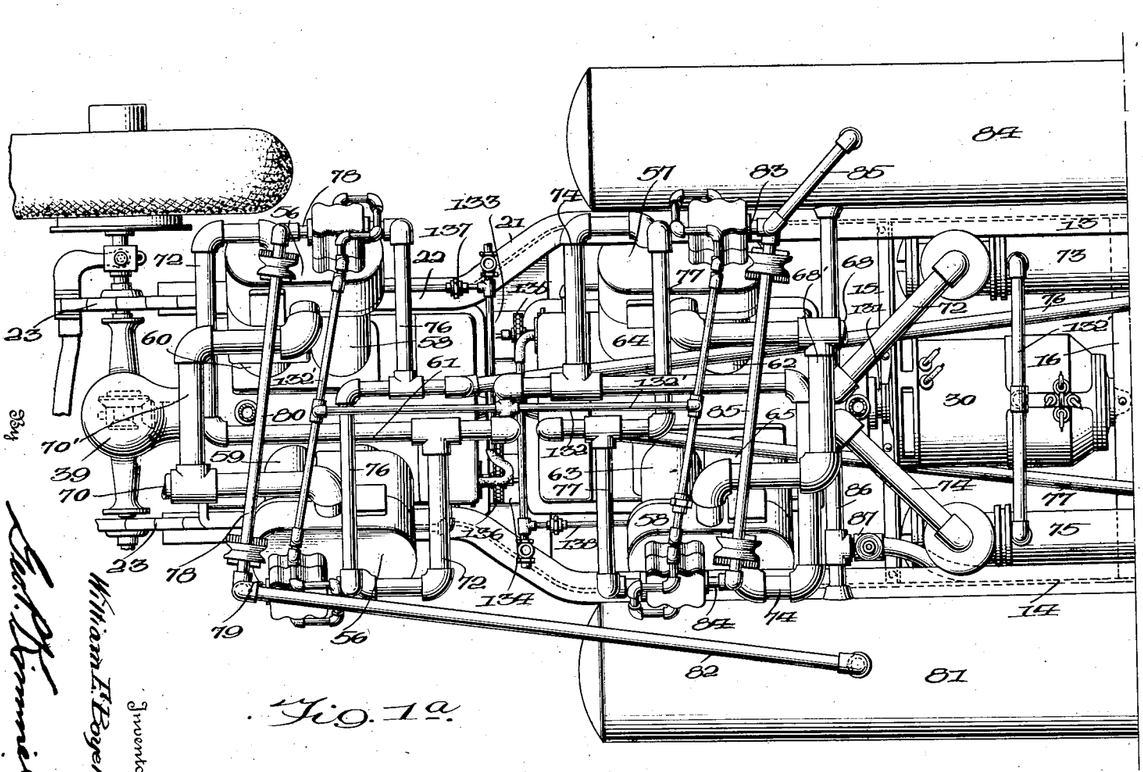
Figures 1ª, 1ᵇ and 1ᶜ when taken together illustrate in top plan, partly broken away, the coach other than the body of the latter.
Figure 1B:
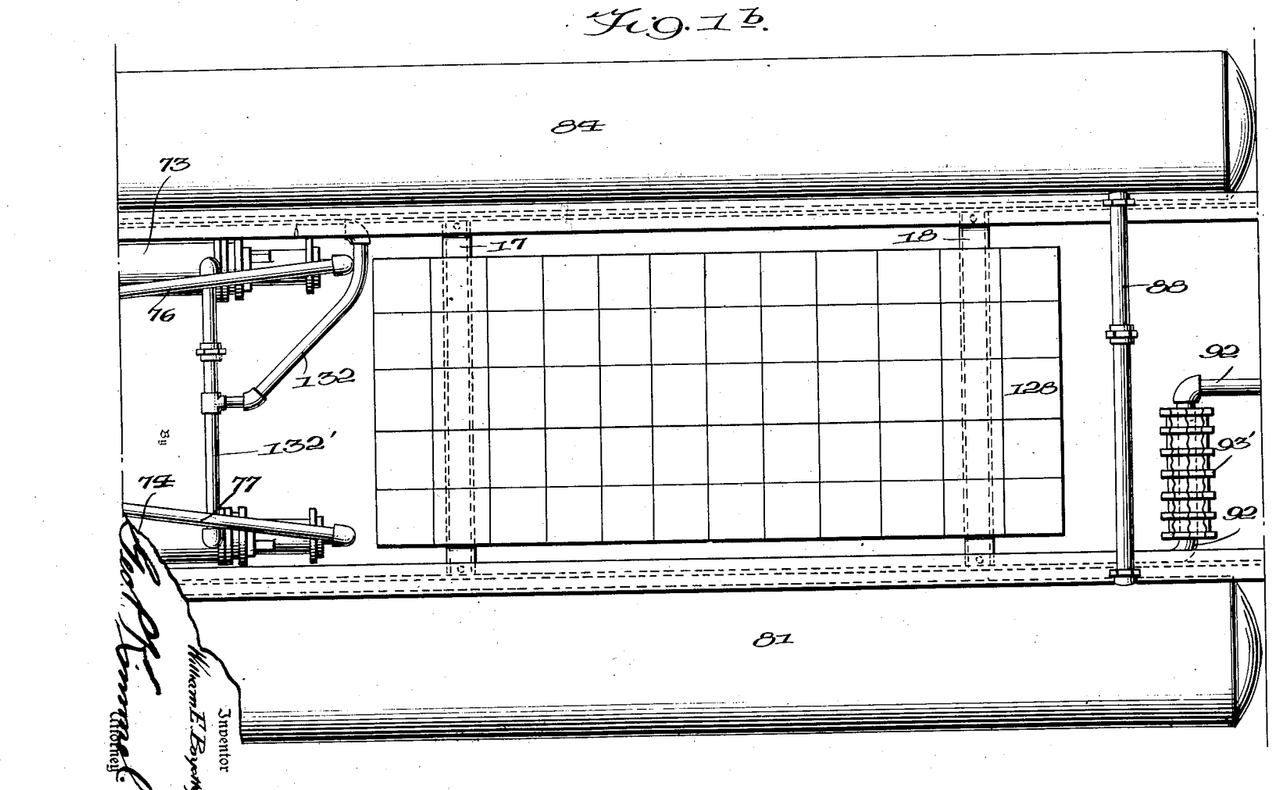
Figure 1C:
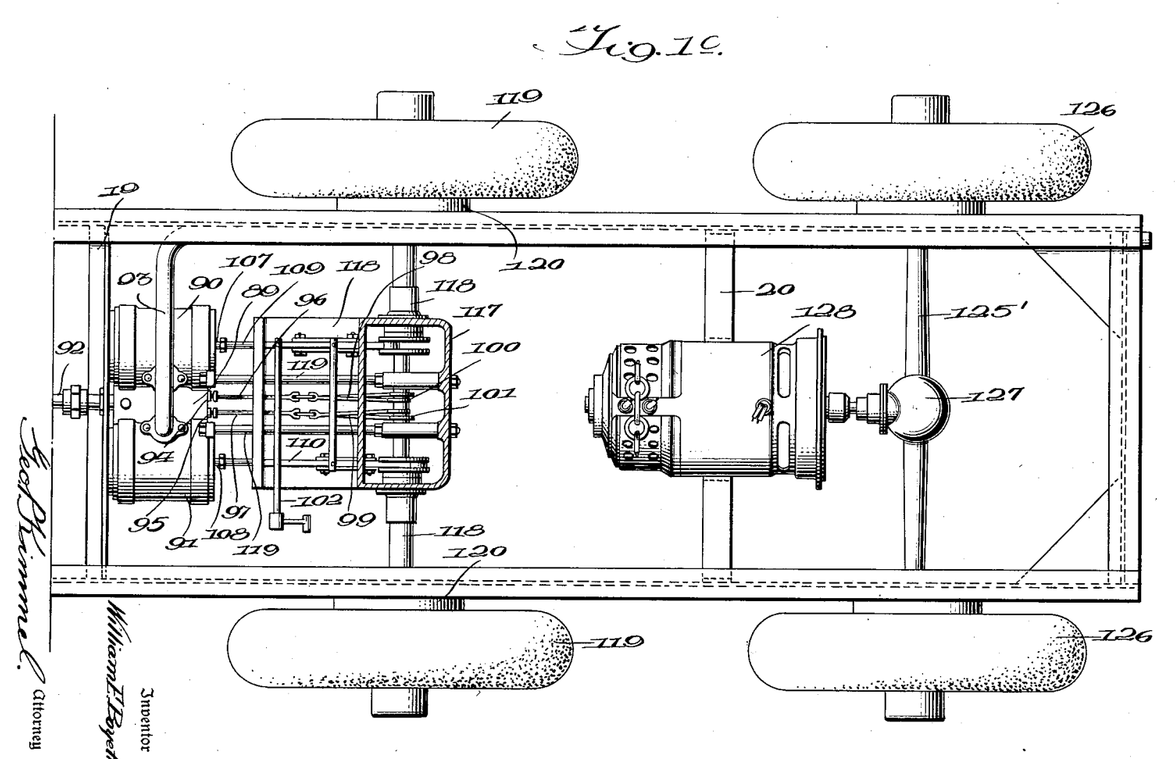
Figure 2A:
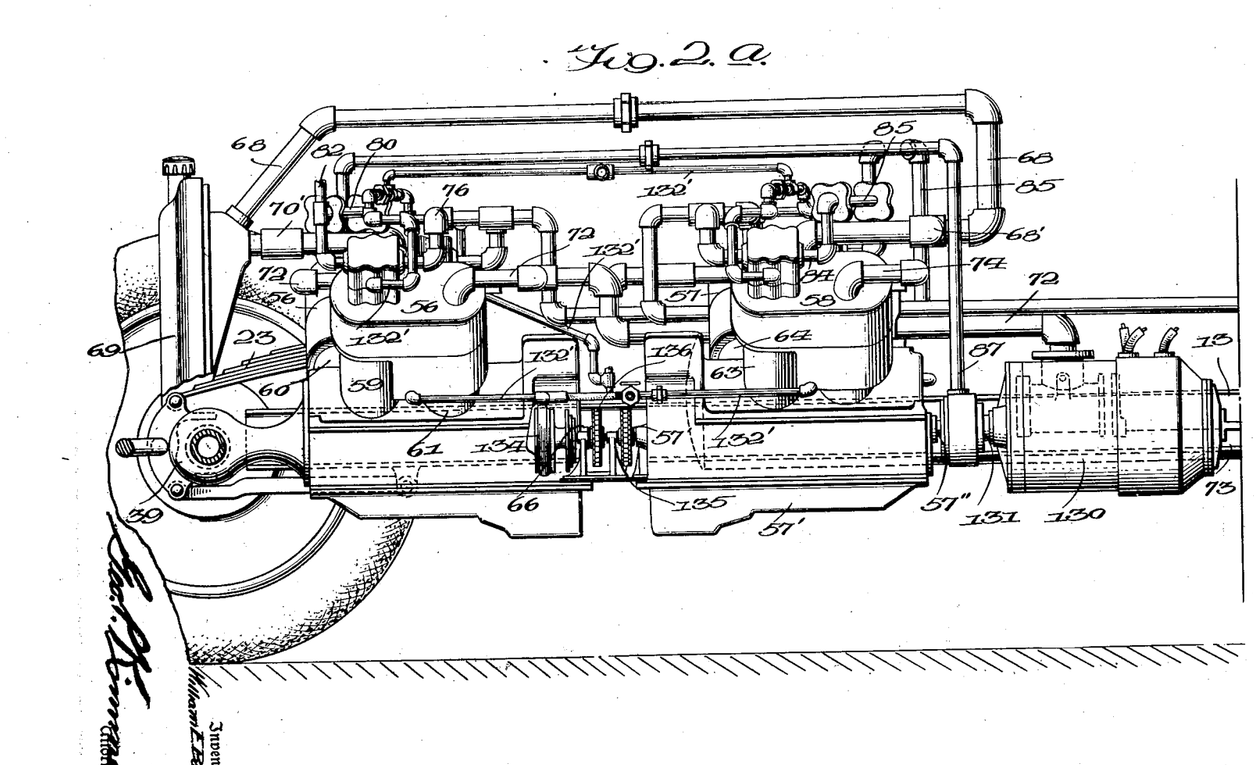
Figures 2ª, 2ᵇ and 2ᶜ when taken together illustrate in side elevation, partly broken away, the coach other than the body of the latter.
Figure 2B:
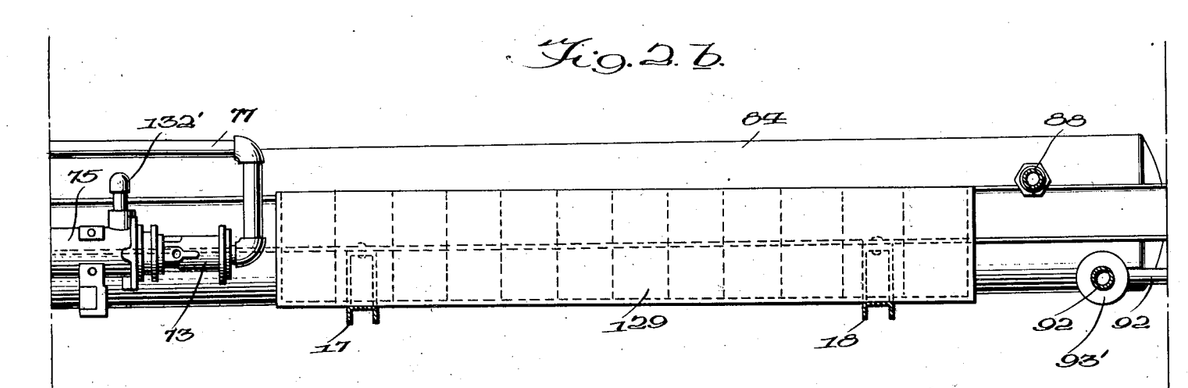
Figure 2C:
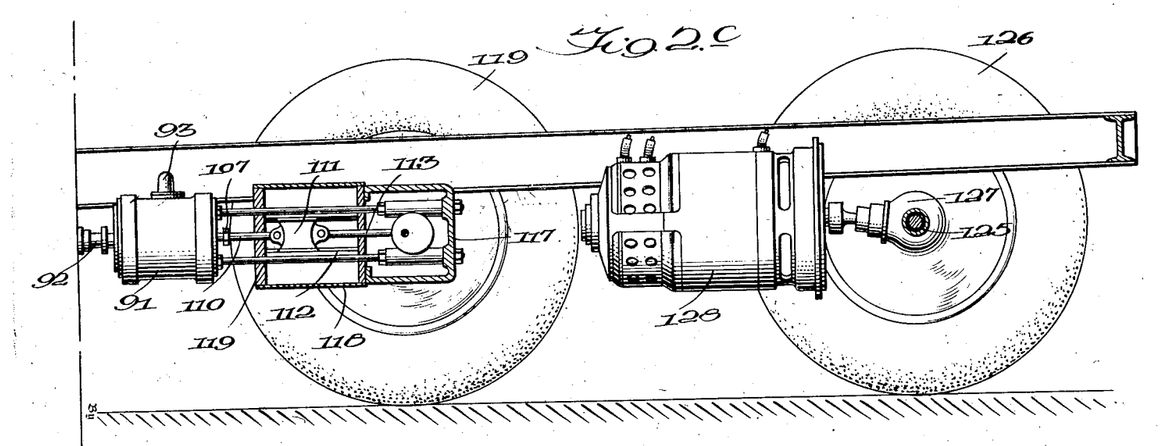
Figure 3:
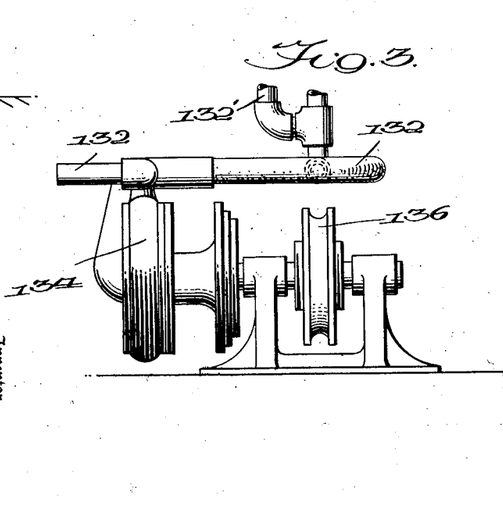
Figure 3 is a detail in side elevation illustrating one of the pumps interposed in the cooling water circulating system.
Figure 4:
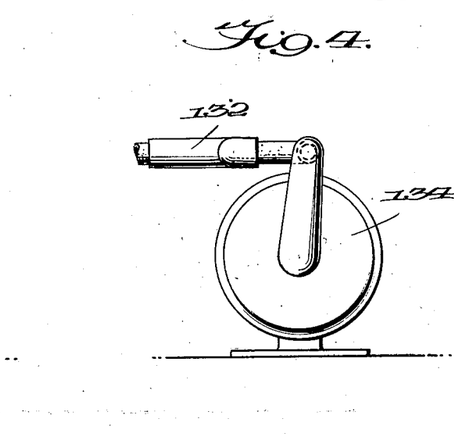
Figure 4 is an end view of the structure shown in Figure 3.
Figure 5:
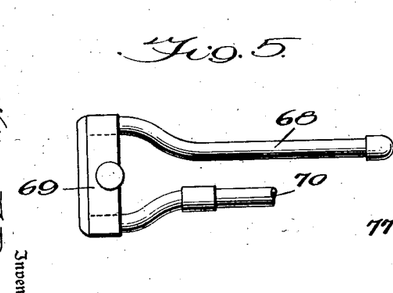
Figure 5 is a top plan view, broken away, showing the air intake pipes for the compressors.
Figure 6:
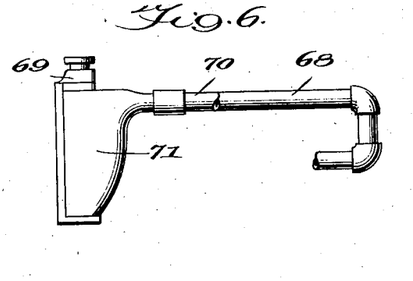
Figure 6 is a side elevation, broken away, illustrating the air intake pipes for the compressors.
Figure 7:
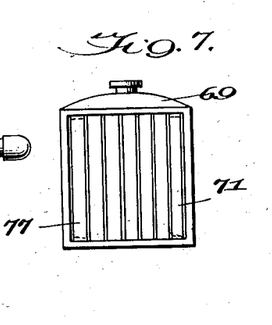
Figure 7 is a front elevation of the radiator.
Figure 8:
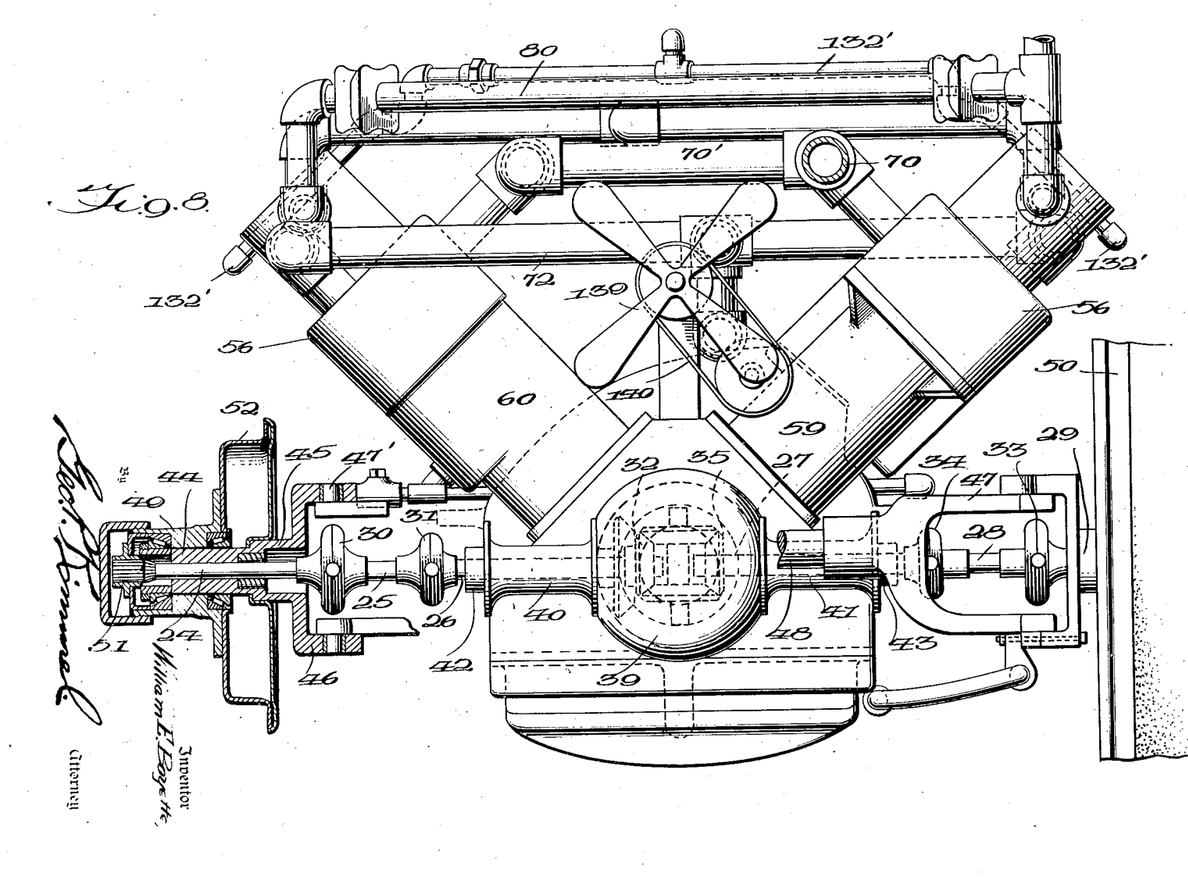
Figure 8 is an elevation, partly in section and partly broken away looking towards the front end of the coach.
Figure 9:
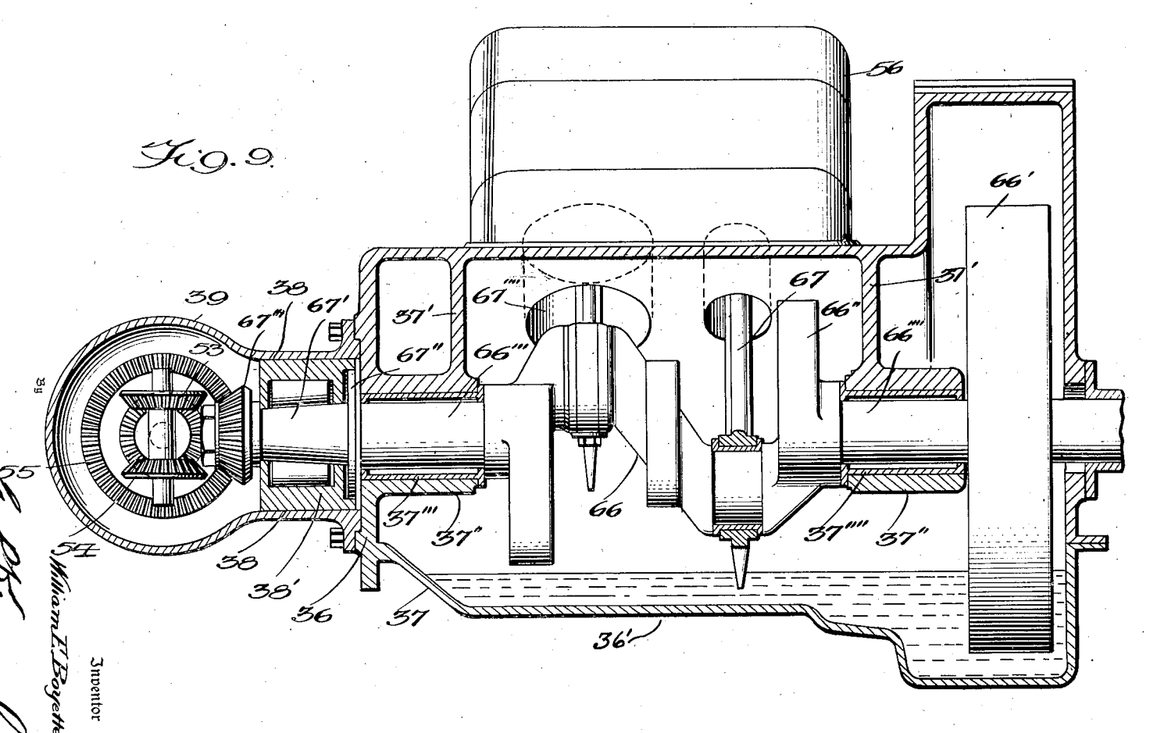
Figure 9 is a detail in longitudinal section illustrating the crank shaft drive from the front axle of the vehicle.
Figures 10, 11, 12:
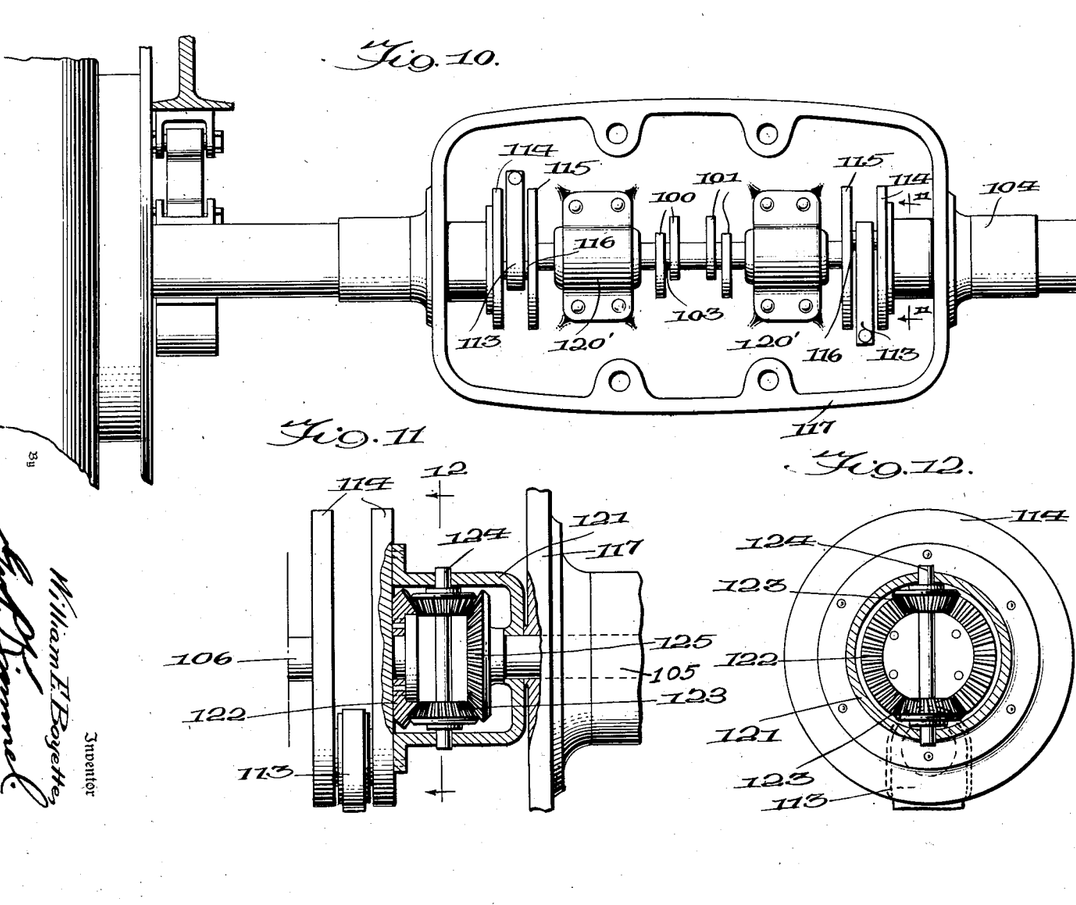
Figure 10 is a fragmentary view in elevation illustrating the driving unit for the forward rear axle.
Figure 11 is a section on line 11—11 Figure 10.
Figure 12 is a section on line 12—12 of Figure 11.

Referring to the drawings, the side bars of the chassis of the coach are designated 13, 14 and the braces or cross bars of the chassis at 15, 16, 17, 18, 19 and 20. Each side bar forwardly thereof is formed with an inturned part 21 which terminates in a straight part 22 disposed in a plane parallel to the rear portion of the bar.

Supported from the front springs 23 of the coach is a front axle formed of two parts, one including the sections 24, 25 and 26 and the other the sections 27, 28 and 29. The sections 24, 29 provide spindles. The sections 24, 25 are connected together by a universal joint 30. The sections 25, 26 by a universal joint 31. The inner end of section 26 has secured thereto a bevel gear 32. The sections 27, 28 are connected together by a universal joint 34. The sections 28, 29 are connected together by a universal joint 33. The section 29 has its inner end provided with a bevel gear 35. Connected to the forward wall 36 of a housing 36', which provides a crank case 37 is a tubular extension 38 formed on the rear side of a globular housing 39. The latter is formed with a pair of oppositely disposed tubular extensions 40, 41 which encompass the front axle sections 26, 27 respectively. The outer ends of extensions 40, 41 are formed with bearings 42, 43 for the front axle sections 26, 27 respectively.

The sections of each part of the front axle rotate in unison. The two parts of the front axle simultaneously rotate.

Loosely mounted on each section 24, 29 is a sleeve 44 provided at its inner end with an inwardly extending tubular offset portion 45, having its inner diameter greater than the inner diameter of the remaining portion of the sleeve. The offset portion 45 terminates in an upstanding yoke 46 which overlaps and is pivotally connected to a fork 47, as at 47'. The forks 47 are connected together by a bar 48 arranged forwardly of housing 39. The yokes are connected together in a known manner to provide for the simultaneous shifting thereof and a known means, operated from the steering post of the coach, is employed for actuating the connecting means between the yokes for the purpose of steering the vehicle. The bar 48 is maintained stationary by any suitable means.

The sleeve 44 has its outer end arranged inwardly of the outer end of section 26 or 27. Revolubly mounted on sleeve 44 is the hub 49 of a front wheel 50 which is coupled to the section 24 or 29, as at 51 in a manner for driving the section from the wheel when the coach is travelling. A brake drum 52 is secured to each wheel 50.

Oppositely disposed, superposed coupling gears 53, 54 are supported in the housing 39.

The gears are of the bevel type and mesh with gears 32, 35. Carried by front axle section 26 is a driving gear 55 for a crank shaft to be presently referred to. The gear 55 is of the beveled type and of greater diameter than gear 32. The gear 55 is for the purpose of operating the crank shaft during the travel of the coach.

Supported from the chassis of the coach is a pair of air compressing structures, one arranged forwardly of the other and each of the V-type, that is to say, each unit comprises two pairs of compressors, the compressors of one pair being disposed at an opposite inclination with respect to the compressors of the other pair. One unit is indicated generally at 56 and the other at 57.

The unit 56 includes a pair of high pressure cylinders 58, 59 and a pair of low pressure cylinders 60, 61. The unit 57 includes a pair of high pressure cylinders 62, 63 and a pair of low pressure cylinders 64, 65. The cylinder 60 is arranged forwardly of and parallel to cylinder 58. The cylinder 59 is arranged forwardly of and parallel to cylinder 61. The cylinder 64 is arranged forwardly of and parallel to cylinder 62. The cylinder 63 is arranged forwardly of and parallel to cylinder 65.

A crank shaft 66 is common to the piston rods 67 of the unit 56 and operates in crank case 37. The construction of shaft 66 is such as to provide for the alternate operation of the high pressure cylinders 58, 59 together alternately with respect to the low pressure cylinders 60, 61. The latter operate in unison. The crank shaft 66 is operated from gear 55 and provided with a fly wheel 66' and carries counter-balances 66" to prevent dead center.

The housing 36' has mounted thereon the cylinders of the unit 56 and has a pair of webs 37' carrying sleeves 37" in which are mounted flanged bearing bushings 37''', 37'''' for the portions 66''', 66'''' of the crank shaft 66 respectively. The crank shaft 66 extends forwardly from bushing 37''' and is formed with a tapered terminal portion 67' carrying at its rear end an annular flange 67". The tapered portion 67' has secured thereto a bevel gear 67''' which meshes with gear 55 for the purpose of driving shaft 66. Arranged within the tubular extension 38 is a bearing element 38' for the portion 67' of shaft 66. The element 38' is interposed between a boss on shaft 66 and the flange 67", as well as overlapping the latter. The housing 36' is formed with openings 67'''' for the passage of the piston rods of the compressors of unit 56.

The unit 57 is mounted on a housing 57' of the same form and which is spaced rearwardly from the housing 36'. Arranged within housing 57' is a crank shaft 57" of the same form as shaft 66, but it is not provided with a gear 67'''. The rear end of shaft 66 extends beyond the rear wall of housing 36' and the forward end of shaft 57" extends beyond the front wall of housing 57. The shafts 57", 66 are arranged in lengthwise opposed spaced alignment.

An air intake 68 having its mouth in one side of the radiator 69, leads from the latter to a branched pipe 68' which opens into cylinders 64, 65 of unit 57. An air intake 70 having its mouth in the other side of radiator 69 leads from the latter to a branched pipe 70' which opens into cylinders 60, 61 of unit 56. The mouth ends 71 of the air intakes are of funnel like form and of oval contour in vertical section. The branched pipes 68', 70' may be provided with check valves.

The low pressure cylinders 60, 61 discharge into a pipe line 72 which opens into the forward end of an after cooler 73 supported by the chassis at one side of the latter. The low pressure cylinders 64, 65 discharge into a pipe line 74 which opens into the forward end of an after cooler 75. Leading forwardly from the rear ends of the after coolers 73, 75 are air conducting lines 76, 77 respectively. The line 76 opens into the high pressure cylinders 58, 59. The line 77 opens into the high pressure cylinders 62, 63.

The high pressure cylinders 58, 59 have their outlets 78, 79 open respectively into a pipe 80, and leading from the outlet 79 to a compressed air storage tank 81 is a compressed air conducting pipe 82. The high pressure cylinders 62, 63 have their outlets 83, 84 open respectively into a pipe 85, and leading from outlet 83 to a compressed air storage tank 84 is a compressed air conducting pipe 85'. The tanks 81 and 84 are supported by the sides of the chassis. At a point between the transverse medians and the forward ends of the tank they are connected together by a discharge pipe 86 which is common to both tanks.

A throttle valve 87, operated by the driver of the coach, is connected to pipe 86 and controls the discharge of compressed air from the tanks to the compressed air operated propelling mechanism for the coach. The tanks communicate with each other in proximity to their rear ends through the medium of a pipe 88.

Leading from the valve 87 to a compressed air feed control valve chest 89 of a pair of compressed air operated driving motors 90, 91 is a power or compressed air feed line 92. The chest 89 is common to the motors. A discharge pipe 93 is common to the motors. The operating means for the valves of the chest will be presently referred to. The line 92 opens into the forward end of chest 89 and passes through an electric heater 93'.

The stems of the valves in chest 89 are indicated at 94, 95 and are connected to shift rods 96, 97 respectively. Attached to rod 96 is a pair of straps 98 and to rod 97 is a pair of straps 99. The pairs of straps 98, 99 respectively extend from eccentrics 100, 101. The arrangement is such that when the rods 96, 97 are shifted by element 102 to a lowered position, the feed of air will be controlled in a manner whereby the coach will be propelled forwardly and when the rods 96, 97 are moved to an elevated position by element 102, the feed of air will be controlled in a manner whereby the coach will be propelled in a rearward direction. The element 102 will be operated by the driver of the coach. The eccentrics 100, 101 are carried by the intermediate section 103 of the forward rear axle 104. The outer sections of axle 104 are designated 105, 106.

The piston rods 107, 108 of the motors 90, 91 respectively are pivotally connected to shift rods 109, 110 respectively. Each shift rod is pivotally attached to a slide 111 operating in guides 112. The slide 111 is pivotally connected to the forward end of an actuating rod 113, the latter having its rear end arranged between a pair of parallel spaced discs 114, 115. The rear end of rod 113 is pivotally connected to and eccentrically with respect to the discs 114, 115. The section 103 of axle 104 has a disc 115 at each end thereof. The discs are concentrically arranged with respect to the axle sections. The pivots 116 for the rear ends of rods 113 connect the discs 114 to the discs 115 whereby the sections of the rear axle are coupled together.

A stationary housing 117 encloses the section 103 and the inner portions of the sections 105, 106 of axle 104. The housing 117 has tubular extensions 118 which enclose the portions of the sections 105, 106. A combined guide and housing 118 is attached to the forward side of housing 117. Stay members 119 extend through the housings 117, 118 and are anchored to the motors 90, 91. The shift rods 109, 110 are guided to extend forwardly from the front of housing 118. The housings 117, 118 have removable covers. The sections 105, 106 have fixed thereto front rear wheels 119, provided with brake drums 120. Spaced bearings 120' within and supported by housing 117 are provided for axle section 103. The eccentrics 100 and 101 are arranged between bearings 120'.

Secured to the outer side face of each disc 114 is a housing 121 which is revolubly mounted on rear axle section 105 or 106. The housings 121 are arranged in housing 117 at the ends of the latter. That face of disc 114 to which housing 121 is attached is provided with a ring gear 122 for driving a pair of oppositely disposed beveled pinions 123 carried by a shaft 124 journaled in opposed wall portions of housing 121. Secured to the inner end of axle section 105 or 106 is a beveled gear 125 which is driven by the pinions 123.

The construction and arrangement of elements with respect to rear axle 104 provides what may be termed a differential semi-floating rear axle drive.

The other axle of the pair of rear axles is indicated at 12', carries a pair of rear wheels 126 and operates a driving element 127 for an electrical generator 128 which is suitably supported by the chassis and electrically connected to a storage battery 129 also supported by the chassis. The battery 129 is in circuit with an electric motor 130 having its shaft 131 coupled to the rear end of crank shaft 57'' for operating the latter.

A cooling water circulating line 132 is provided for the compressor units and after coolers. The line 132 is suitably branched, as at 132' for the purpose intended and leads from and returns to the radiator. Water circulating pumps 133, 134 are interposed in the line 132, the former being operated from crank shaft 57'', as at 135 and the latter from crank shaft 66, as at 136 by a power take off. Brackets are provided for supporting the pumps. One pump is arranged on one side and the other on the other side of the chassis. The motor 130 is air cooled.

Valve controlled drain pipes 137, 138 are provided for the units 56, 57, respectively.

A fan 139, arranged rearwardly of the radiator, is operated by a power take off 140 from the shaft 66.

The motor 130 is started, causing thereby the operation of unit 57, the storing of compressed air in the tank and the operation of the motors 90, 91 providing for the propelling of the coach, and as the latter travels the unit 56 will be operated. When a sufficient quantity of air has been stored in the tanks, the motor 130 is cut off as the operation of unit 56 will compress sufficient air to provide for the travel of the vehicle, if not, then the unit 57 will be thrown into operation. The compressed air from the low compressor cylinders passes into the after coolers and from there into the high compression cylinders, from the latter to the tanks, and from the tanks for the purpose of operating the driving mechanism on the front rear axle. The generator will be operated for charging the battery during the travel of the vehicle, thereby providing for sufficient current to operate motor 130 when desired.

What I claim is:—

1. In an automotive vehicle, a propelling mechanism therefor, compressed air actuated mechanism for operating the propelling mechanism to provide for the travel of the vehicle, air compressing means, an electric motor for operating the latter, an air compressing means driven from the vehicle on the travel of the latter, each of said air compressing means including high and low compression cylinders, a pair of after coolers, each communicating with the low and high compression cylinders of one of the air compressing means, compressed air storage tanks communicating with each other, means for conducting compressed air from the high compression cylinders of said pair of air compressing means to said tanks, and controllable means common to said tanks for controlling a supply of compressed air to said compressed air actuated mechanism for controlling the operation of said propelling mechanism.

2. In an automotive vehicle, a propelling mechanism therefor, compressed air actuated mechanism for operating the propelling mechanism to provide for the travel of the vehicle, a pair of air compressing units, each including a pair of high and a pair of low compression cylinders arranged in V-form, a pair of after colers, each communicating at one end with the low compression and at its rear with the high compression cylinders of a unit, compressed air storage means for receiving the compressed air from said high compression cylinders, an electric motor for operating one of said units, said propelling mechanism arranged rearwardly of said storage means, means arranged forwardly of said units and driven from the vehicle on the travel thereof for operating said other unit, and controllable compressed air conducting means leading from said storage means to said compressed air actuated mechanism for controlling the operation of the latter.

3. In an automotive vehicle, a pair of compressed air operated motors, a driven rear axle structure including an inner and a pair of outer sections, said inner section having a disc at each end, means for rotating each of said outer sections, driving connections eccentrically connected to said discs and rotating means for said outer sections, said driving connections being operated from said motors, and controllable air compressing and air conducting means leading to said motors to provide for the operation of the latter.

4. In an automotive coach, a pair of air compressor units, an electric motor for operating one of said units, means arranged at the front of the vehicle and driven by the latter on its travel for operating the other of said units, each of said units including high compression and low compression cylinders, means for conducting compressed air from the low to the high compression cylinders of a unit and having interposed therein an after cooler, a pair of compressed air storage tanks communicating with each other and communicating with the high compression cylinders of said units for receiving compressed air therefrom, compressed air operated driving means for the vehicle arranged at the rear of the latter, and a controllable compressed air conducting means leading from said tanks to said driving means for controlling the operation of the latter.

5. In an automotive coach, a pair of air compressor units, an electric motor for operating one of said units, means arranged at the front of the vehicle and driven by the latter on its travel for operating the other of said units, each of said units including high compression and low compression cylinders, means for conducting compressed air from the low to the high compression cylinders of a unit and having interposed therein an after cooler, a pair of compressed air storage tanks communicating with each other and communicating with the high compression cylinders of said units for receiving compressed air therefrom, compressed air operated driving means for the vehicle arranged at the rear of the latter, a controllable compressed air conducting means leading from said tanks to said driving means for controlling the operation of the latter, a battery in circuit with said motor, and a generator arranged at the rear of and operated by the vehicle on the travel of the latter for charging said battery.

6. In an automotive coach, a pair of air compressor units, an electric motor for operating one of said units, means arranged at the front of the vehicle and driven by the latter on its travel for operating the other of said units, each of said units including high compression and low compression cylinders, means for conducting compressed air from the low to the high compression cylinders of a unit and having interposed therein an after cooler, a pair of compressed air storage tanks communicating with each other and communicating with the high compression cylinders of said units for receiving compressed air therefrom, compressed air operated driving means for the vehicle arranged at the rear of the latter, a controllable compressed air conducting means leading from said tanks to said driving means for controlling the operation of the latter, a battery in circuit with said motor, a generator arranged at the rear of and operated by the vehicle on the travel of the latter for charging said battery, and a cooling water circulating line common to said units and after coolers and having interposed therein water circulating pumps operated from the means for operating the units.

7. In an automotive coach, a pair of air compressor units, an electric motor for operating one of said units, means arranged at the front of the vehicle and driven by the latter on its travel for operating the other of said units, each of said units including high compression and low compression cylinders, means for conducting compressed air from the low to the high compression cylinders of a unit and having interposed therein an after cooler, a pair of compressed air storage tanks communicating with each other and communicating with the high compression cylinders of said units for receiving compressed air therefrom, compressed air operated driving means for the vehicle arranged at the rear of the latter, a controllable compressed air conducting means leading from said tanks to said driving means for controlling the operation of the latter, and an electric heater encompassing said compressed air conducting means.

8. In an automotive coach, a pair of air compressor units, an electric motor for operating one of said units, means arranged at the front of the vehicle and driven by the latter on its travel for operating the other of said units, each of said units including high compression and low compression cylinders, means for conducting compressed air from the low to the high compression cylinders of a unit and having interposed therein an after cooler, a pair of compressed air storage tanks communicating with each other and communicating with the high compression cylinders of said units for receiving compressed air therefrom, compressed air operated driving means for the vehicle arranged at the rear of the latter, a controllable compressed air conducting means leading from said tanks to said driving means for controlling the operation of the latter, a battery in circuit with said motor, a generator arranged at the rear of and operated from the vehicle on the travel of the latter for charging said battery, a cooling water circulating line common to said units, and after coolers and having interposed therein water circulating pumps operated from the means for operating the units, and an electric heater encompassing said compressed air conducting means.

9. In an automotive vehicle, a front axle driven by the vehicle on the travel of the latter, a pair of rear axles, one arranged rearwardly of the other and driven from the vehicle on the travel of the latter, the other including means for driving it to provide for the travel of the vehicle, a pair of air compressor units, one arranged forwardly of the other, an electric motor for operating said rear unit, means operated by and arranged at the forward end of the vehicle for driving the forward unit on the travel of the vehicle, a storage battery in circuit with said motor, an electric generator in circuit with said battery and operated by the rearward rear axle on the travel of the vehicle, compressed air storage means for receiving compressed air from said units, compressed air operated means for operating the driving means for said forward rear axle, and a controllable compressed air conducting means leading to said compressed air operated means for controlling the operation of the latter.

10. In an automotive vehicle, a pair of crank shafts, a pair of air compressor units, each operated from one of said shafts, an electric motor for operating one of said crank shafts, a front axle driven by the vehicle on the travel of the latter, an operative drive connection between the other of said crank shafts and said axle, a rear axle, a differential semi-floating drive for the latter, compressed air operated means for operating the rear axle drive, a pair of compressed air storage tanks communicating with each other and each receiving compressed air from one of said units, and a controllable compressed air conducting means leading from said tanks to said compressed air operated means for controlling the operation of the latter.

11. In an automotive vehicle, a pair of crank shafts, a pair of air compressor units, each operated from one of said shafts, an electric motor for operating one of said crank shafts, a front axle driven by the vehicle on the travel of the latter, an operative drive connection between the other of said crank shafts and said axle, a rear axle, a differential semi-floating drive for the latter, compressed air operated means for operating the rear axle drive, a pair of compressed air storage tanks communicating with each other and each receiving compressed air from one of said units, a controllable compressed air conducting means leading from said tanks to said compressed air operated means for controlling the operation of the latter, and means for reversing the direction of movement of said compressed air operated means.

12. In an automotive vehicle, a front axle driven by the vehicle on the travel thereof and including two sets of sections, the sections of each set being connected by universal joints, a front wheel fixed to the outer section of each set, a steering mechanism coupled with the sections of said sets, a pair of air compressor units, an independent crank shaft for operating each unit, an operative drive connection between the inner sections of said sets and one of the crank shafts for driving the latter on the travel of the vehicle, an electric motor for driving the other of the crank shafts, compressed air storage means for receiving compressed air from said units, a rear axle, a differential semi-floating drive for the latter, compressed air operated means for operating the rear axle drive, and a controllable compressed air conducting means leading from said storage means for controlling the operation of said compressed air operated means.

13. In an automotive vehicle, a pair of air compressor units, each including a pair of high compression and a pair of low compression cylinders, the cylinders of each unit being arranged in V-form, a pair of after coolers, means for conducting compressed air from the low compression cylinders of each unit to the high compression cylinders of the latter and having interposed therein an after cooler, a pair of compressed air storage tanks communicating with each other, means for conducting compressed air from the high compression cylinders of each unit to a tank, an electric motor for operating one of said units, a front axle rotating on the travel of the vehicle, a driving connection between said axle and the other of said units, a rear axle, driving means therefor, compressed air operated motors for actuating said driving means to propel the vehicle, and a controllable compressed air conducting means leading from said tanks to said motors for controlling the operation of the latter.

14. In an automotive vehicle, a pair of air compressor units, each including a pair of high compression and a pair of low compression cylinders, the cylinders of each unit being arranged in V-form, a pair of after coolers, means for conducting compressed air from the low compression cylinders of each unit to the high compression cylinders of the latter and having interposed therein an after cooler, a pair of compressed air storage tanks communicating with each other, means for conducting compressed air from the high compression cylinders of each unit to a tank, an electric motor for operating one of said units, a front axle rotating on the travel of the vehicle, a driving connection between said axle and the other of said units, a rear axle, driving means therefor, compressed air operated motors for actuating said driving means to propel the vehicle, a controllable compressed air conducting means leading from said tanks to said motors for controlling the operation of the latter, a radiator, and a cooling water circulating line leading from and to said radiator and common to said units and after coolers.

15. In an automotive vehicle, a front axle driven by the vehicle on the travel thereof and including two sets of sections, the sections of each set being connected by universal joints, a front wheel fixed to the outer section of each set, a steering mechanism coupled with the sections of said sets, a pair of air compressor units, an independent crank shaft for operating each unit, an operative drive connection between the inner sections of said sets and one of the crank shafts for driving the latter on the travel of the vehicle, an electric motor for driving the other of the crank shafts, compressed air storage means for receiving compressed air from said units, a rear axle, a differential semi-floating drive for the latter, compressed air operated means for operating the rear axle drive, a controllable compressed air conducting means leading from said storage means for controlling the operation of said compressed air operated means, a radiator, an air intake leading from said radiator to one of said units, and an air intake leading from said radiator to the other of said units.

16. In an automotive vehicle, a driven rear axle including an inner and a pair of outer sections, two pairs of opposed spaced discs, a driving connection between and eccentrically connected to the discs of each pair, one of the discs of each pair revolubly mounted on an outer section, the other discs of said pairs being fixed to said inner section, an operative drive connection between said revoluble discs and said outer sections, air compressing means, a compressed air storage means receiving compressed air from said air compressing means, operating means for said air compressing means, compressed air operated means for operating said driving connections, and a controllable compressed air conducting means leading from said storage means to said compressed air operated means for controlling the operation of the latter.

17. In an automotive vehicle, a driven rear axle including an inner and a pair of outer sections, two pairs of opposed spaced discs, a driving connection between and eccentrically connected to the discs of each pair, one of the discs of each pair revolubly mounted on an outer section, the other discs of said pairs being fixed to said inner section, an operative drive connection between said revoluble discs and said outer sections, a front axle driven from the vehicle on the travel thereof and including two independent sets of endwise aligned universally jointed sections, means for connecting a steering mechanism to the outer section of each set, a pair of air compressor units, an independent crank shaft for operating each unit, an operative drive connection between the inner sections of said sets and one of the crank shafts, an electric motor for operating the other of said crank shafts, compressed air storage means receiving compressed air from said units, compressed air operated means for operating the driving connections for said discs, and a controllable compressed air conducting means leading from said storage means to said compressed air operated means for controlling the operation of the latter.

In testimony whereof, I affix my signature hereto.

WILLIAM E. BOYETTE.